United States Patent
Judd

(10) Patent No.: US 8,423,276 B2
(45) Date of Patent: Apr. 16, 2013

(54) SYSTEMS AND METHODS FOR DETERMINING ENTRY OF A NAVIGATION SYSTEM INTO A STRUCTURE

(75) Inventor: Tom Judd, Carlsbad, CA (US)

(73) Assignee: Honeywell International Inc., Morristown, NJ (US)

( * ) Notice: Subject to any disclaimer, the term of this patent is extended or adjusted under 35 U.S.C. 154(b) by 1065 days.

(21) Appl. No.: 12/111,879

(22) Filed: Apr. 29, 2008

(65) Prior Publication Data

US 2009/0267592 A1    Oct. 29, 2009

(51) Int. Cl.
*G01C 21/00* (2006.01)

(52) U.S. Cl.
USPC .......................................................... 701/213

(58) Field of Classification Search .................. 701/213, 701/220
See application file for complete search history.

(56) References Cited

U.S. PATENT DOCUMENTS

| 7,155,836 B2* | 1/2007 | Kwon et al. ..................... 33/356 |
| 2005/0001814 A1 | 1/2005 | Anton et al. |
| 2008/0077326 A1* | 3/2008 | Funk et al. ..................... 701/220 |

OTHER PUBLICATIONS

Clinard, et al. Residential magnetic field measurements in France: Comparison of indoor and outdoor measurements. Bioelectromagnetics: vol. 20, Issue 5, pp. 319-326. 1999.*
Bakhru, Kesh. A seamless tracking solution for indoor and outdoor position location. 2005 IEEE 16th International Symposium on Personal, Indoor, and Mobile Radio Communications: vol. 3, pp. 2029-2033. Sep. 11-14, 2005.*

* cited by examiner

*Primary Examiner* — Sheetal R Rangrej
(74) *Attorney, Agent, or Firm* — Fogg & Powers LLC

(57) ABSTRACT

Systems and methods are operable to determine that a navigation system has entered a structure. An exemplary embodiment monitors a magnetic field at an outdoor position, monitors a magnetic field at a current position, compares a characteristic of the monitored magnetic field at the current position with a corresponding characteristic of the outdoor magnetic field, and determines entry into the structure at least as a function of a change in the determined characteristic of the monitored magnetic field from the corresponding characteristic of the outdoor magnetic field.

20 Claims, 7 Drawing Sheets

SYSTEMS AND METHODS FOR DETERMINING ENTRY OF A NAVIGATION SYSTEM INTO A STRUCTURE

BACKGROUND OF THE INVENTION

A navigation device may use information from a dead reckoning navigation system to estimate its current position. A dead reckoning navigation system may include a compass, a plurality of optional accelerometers, and a plurality of optional gyroscopes, to estimate position. The compass senses direction. The accelerometers sense linear acceleration of the navigation device platform. The gyroscopes sense rotation of the navigation device platform. Changes in position are determinable from the sensed linear acceleration, in view of the sensed direction, of the navigation device platform.

The navigation device may also use information from a global navigation satellite system (GNSS) to estimate its current position. Examples of GNSS systems include, but are not limited to, global positioning systems (GPS) or long range navigation systems (LORAN).

When the GNSS device receives a sufficient number of satellite signals so as to accurately determine location, the navigation device may substantially rely on the location information provided by the GNSS device. However, if the GNSS device is unable to accurately determine its location, such as when an insufficient number of satellite signals are available, the inaccurate location information from the GNSS device may result in an undesirable error in the navigation device's estimated location.

GNSS devices are often unable to accurately determine location when in a structure, such as a building or parking garage. For example, satellite signals may be lost such that the GNSS device is unable to determine location. As another example, satellite signal reflections may be detectable by the GNSS device. However, such satellite signal reflections may introduce errors in the location information determined by the GNSS device.

In the event that the navigation system determines that the location information provided by the GNSS device is in error, the navigation system will then rely on its dead reckoning navigation system to estimate its position. However, until the navigation device recognizes that the location information provided by it GNSS device is no longer valid, the navigation device will incorrectly estimate location since it is relying on the invalid location information provided by its GNSS device.

Accordingly, there is a need to more quickly and reliably detect the occurrence of invalid location information provided by the GNSS device. The need to more quickly and reliably detect the occurrence of invalid GNSS location information is even more important in navigation devices that can be expected to be taken into a structure since the structure is likely to disrupt the ability of the GNSS device to receive a sufficient number of satellite signals which are used to determine the GNSS location information.

SUMMARY OF THE INVENTION

Systems and methods of determining that a navigation system has entered a structure are disclosed. An exemplary embodiment monitors a magnetic field at an outdoor position, monitors a magnetic field at a current position, compares a characteristic of the monitored magnetic field at the current position with a corresponding characteristic of the outdoor magnetic field, and determines entry into the structure at least as a function of a change in the determined characteristic of the monitored magnetic field from the corresponding characteristic of the outdoor magnetic field.

In accordance with further aspects, an exemplary embodiment has a navigation sensor system operable to generate information corresponding to at least one of a direction, a rotation, and an acceleration, a magnetic field detection unit operable to sense a magnetic field, a global navigation satellite system (GNSS) unit operable to receive a plurality of GNSS satellite signals and operable to determine current position of the navigation system, and a processor system communicatively coupled to the navigation sensor system, the magnetic field detection unit, and the GNSS unit. The processor system is operable to monitor the magnetic field at a current position of the navigation system from information received from the magnetic field detection unit, determine a characteristic of the monitored magnetic field, compare the determined characteristic of the monitored magnetic field with a corresponding characteristic of an outdoor magnetic field, and determine that the navigation system has entered a structure in response to a change in the determined characteristic of the monitored magnetic field from the corresponding characteristic of the outdoor magnetic field.

BRIEF DESCRIPTION OF THE DRAWINGS

Preferred and alternative embodiments are described in detail below with reference to the following drawings.

DETAILED DESCRIPTION OF THE PREFERRED EMBODIMENT

Figure 1:
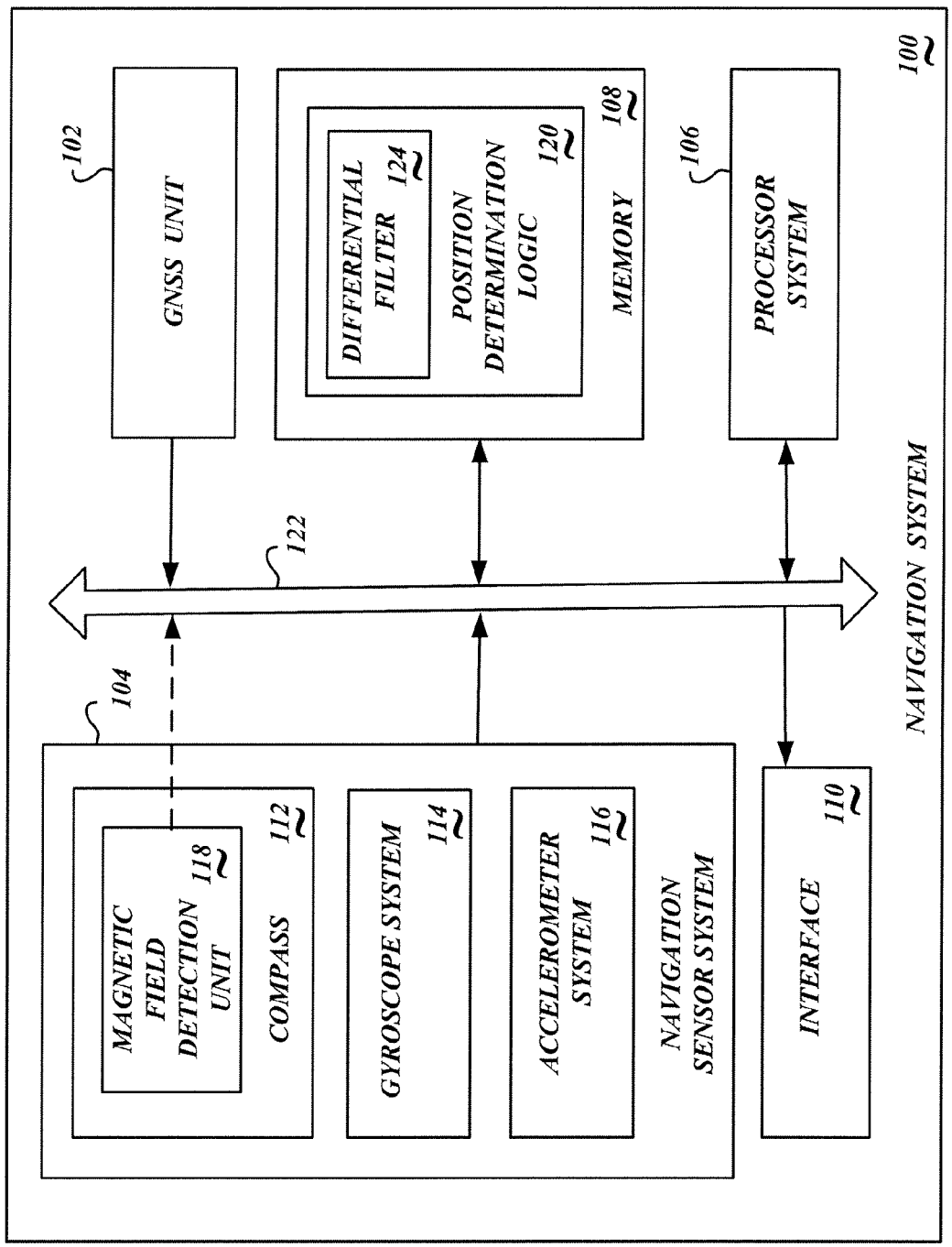
FIG. 1 is a block diagram of an embodiment of a navigation system.

FIG. 1 is a block diagram of an embodiment of a navigation system 100. An exemplary embodiment of the navigation system 100 comprises a global navigation satellite system (GNSS) unit 102, a navigation sensor system 104, a processor system 106, a memory 108, and an interface 110. As a non-limiting example, an embodiment of the navigation system 100 may be integrated into a pedometer that estimates the distance traveled by a person carrying the pedometer.

Characteristics of a magnetic field in an outdoor environment, where the GNSS unit 102 is likely to receive a sufficient number of GNSS satellite signals for accurate determination of the location information, are quite different from the characteristics of a magnetic field encountered in a structure, such as a building or parking garage. Such structures typically include significant amounts of structural metals. Further, objects within the structure are often made of metal. The metal structures and/or metal objects, particularly if made of iron, alter the characteristics of the magnetic fields passing through the structure. These altered characteristics of the magnetic fields are quite different from the characteristics of the magnetic fields in an outdoor environment.

Embodiments of the navigation system 100 allow a determination that the GNSS unit 102 may not be providing accurate location information by sensing the characteristics of the magnetic fields surrounding the navigation system 100. Characteristics of the detected magnetic fields are monitored directly or determined from the detected magnetic field. Changes of the monitored magnetic field characteristics may indicate an entry of the navigation system 100 into a structure where its GNSS unit 102 is likely no longer able to accurately determine the location information. Accordingly, the navigation system 100 then uses the navigation sensor system 104 to estimate the current position of the navigation system 100.

The navigation sensor system 104 includes a compass 112, an optional gyroscope system 114 with a plurality of gyroscopes (not shown), and an optional accelerometer system 116 with a plurality of accelerometers (not shown). The compass 112 includes a magnetic field detection unit 118 that is operable to detect characteristics of the magnetic fields surrounding the navigation system 100. The magnetic field detection unit 118 detects one or more of the characteristics of the local magnetic field, such as, but not limited to, the magnetic field strength.

The exemplary navigation sensor system 104 is operable to sense direction, linear acceleration, and rotation, respectively, of the navigation system 100. The direction of magnetic north is sensed by the compass system 112. An exemplary compass system 112 employs a three-dimensional array of magnetometers for the compass function. Any suitable compass system 112 may be used in the various embodiments of the navigation system 100.

Rotational changes of the navigation system 100 may be sensed by the optional gyroscope system 114. Rotational information may be optionally used for a variety of purposes, such as determining changes in direction and/or orientation of the navigation system 100.

Linear acceleration of the navigation system 100 may be sensed by the optional accelerometer system 116. The accelerometer system 116 may provide information to determine a vertical direction from gravity, thereby allowing determination of the horizontal plane of the compass 112. Some embodiments employ a three-dimensional array of accelerometers which provide information for determining the traveled distance. As a first non-limiting example, an accelerometer may use acceleration information twice integrated to determine traveled distance. As another non-limiting example, a pedometer may use the acceleration information from the accelerometer system 116 to estimate the number of steps taken by a person carrying the pedometer. Any suitable accelerometer system 116, or other suitable distance determination means, may be used in the various embodiments of the navigation system 100.

Accordingly, changes in position of the navigation system 100 are determinable by the navigation sensor system 104 from the sensed direction, linear acceleration, and/or rotation of the navigation system 100.

The GNSS unit 102 determines location information based upon the detection of a plurality of GNSS satellites. The GNSS unit 102 outputs the location information that is used to determine the current position of the navigation system 100.

The processor system 106 receives the location information from the GNSS unit 102. The processor system 106 also receives information corresponding to changes in direction (based upon the direction of magnetic north that is sensed by the compass 112), changes in orientation (as sensed by the gyroscope system 114), and changes in acceleration (as sensed by the accelerometer system 116) from the navigation sensor system 104. The processor system 106, which retrieves and executes the position determination logic 120, estimates the current position of the navigation system 100 based upon the location information determined by the GNSS unit 102 and based upon at least one of the changes in the direction, the orientation, and/or the acceleration sensed by the navigation sensor system 104.

The interface 110 generates information that is communicated to one or more devices (not shown) which provide an indicia corresponding to the estimated current position of the navigation system 100. For example, the estimated current position of the navigation system 100 may be shown on a map or the like which is presented on a display. Or, the estimated current position of the navigation system 100 may be presented in an audible manner using a speaker. In some embodiments, the estimated current position of the navigation system 100 is provided as an electronic signal that is received by another device or system.

It is appreciated that other components and/or systems (not shown) may reside in the navigation system 100. For example, a temperature sensor, a barometric sensor, and a power supply may be included in the navigation system 100.

The GNSS unit 102, the navigation sensor system 104, the processor system 106, the memory 108, and the interface 110, are coupled to a communication bus 122, thereby providing connectivity to the above-described components. In alternative embodiments of the navigation system 100, the above-described components may be communicatively coupled to to each other in a different manner. For example, one or more of the above-described components may be directly coupled to the processor system 106, or may be coupled to the processor system 106 via intermediary components (not shown).

Figure 2:
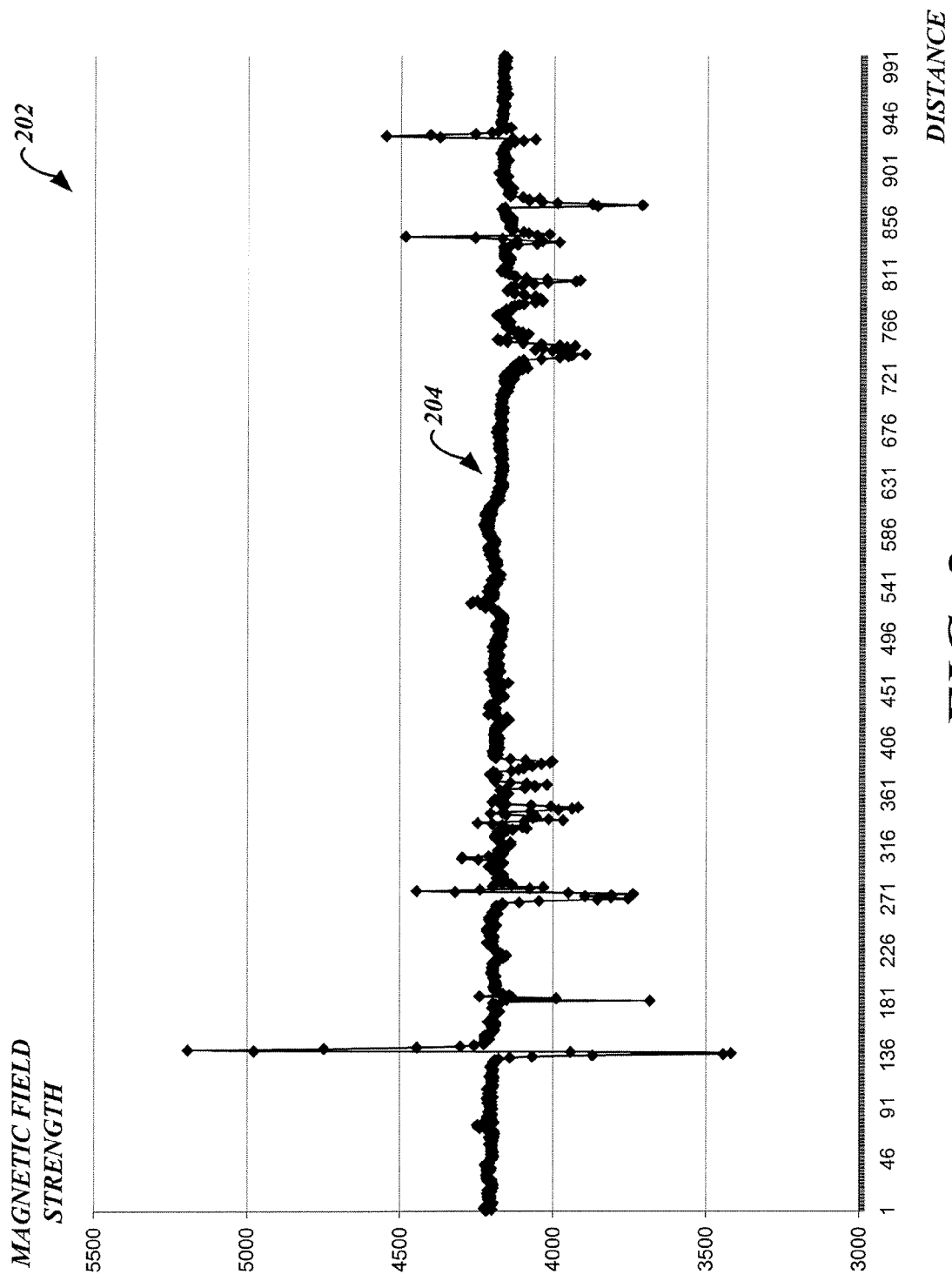
FIG. 2 is a plot of a sample of the magnetic field magnitude encountered in an outdoor environment.

FIG. 2 is a plot 202 of a sample of the magnetic field magnitude encountered in an outdoor environment. The horizontal axis of the plot 202 corresponds to distance travelled. For the plot 202, the exemplary distance is measured in strides (steps) as determined by a pedometer (navigation system 100).

The vertical axis of the plot 202 corresponds to the magnetic field strength as measured by the magnetic field detection unit 118. The magnetic field strength is the vector magnitude of the three-dimensional (3D) components of the magnetic field as measured by the magnetic field detection unit 118. The magnetic field strength may be represented as counts, or another unit of measure pertaining to magnetic field strength. Any unit of measure, or normalization thereof, may be used. It is appreciated that magnetic field strength varies upon location, and that the relative changes of magnetic field strength are considered when determining whether the navigation system 100 has entered, or has left, a structure.

The data represented by the plot 202 was collected while traversing a sidewalk. The discontinuities or perturbations in the magnetic field strength in the early part of the plot 202, generally discernable as spikes, were noted in the vicinity of parked cars. The variations in the magnetic field strength during the latter part of the plot 202 were observed in proximity to a manhole cover, to an underground pipe, and to an electric utility power transformer.

It is appreciated that even though the spikes may be large, the magnetic field strength returns to a baseline 204 which is maintained throughout the plot 202. The baseline 204 indicates the average magnetic field strength encountered while the navigation system 100 is in an outdoor environment that is proximate to a structure that may be entered at some future point in time.

Figure 3:
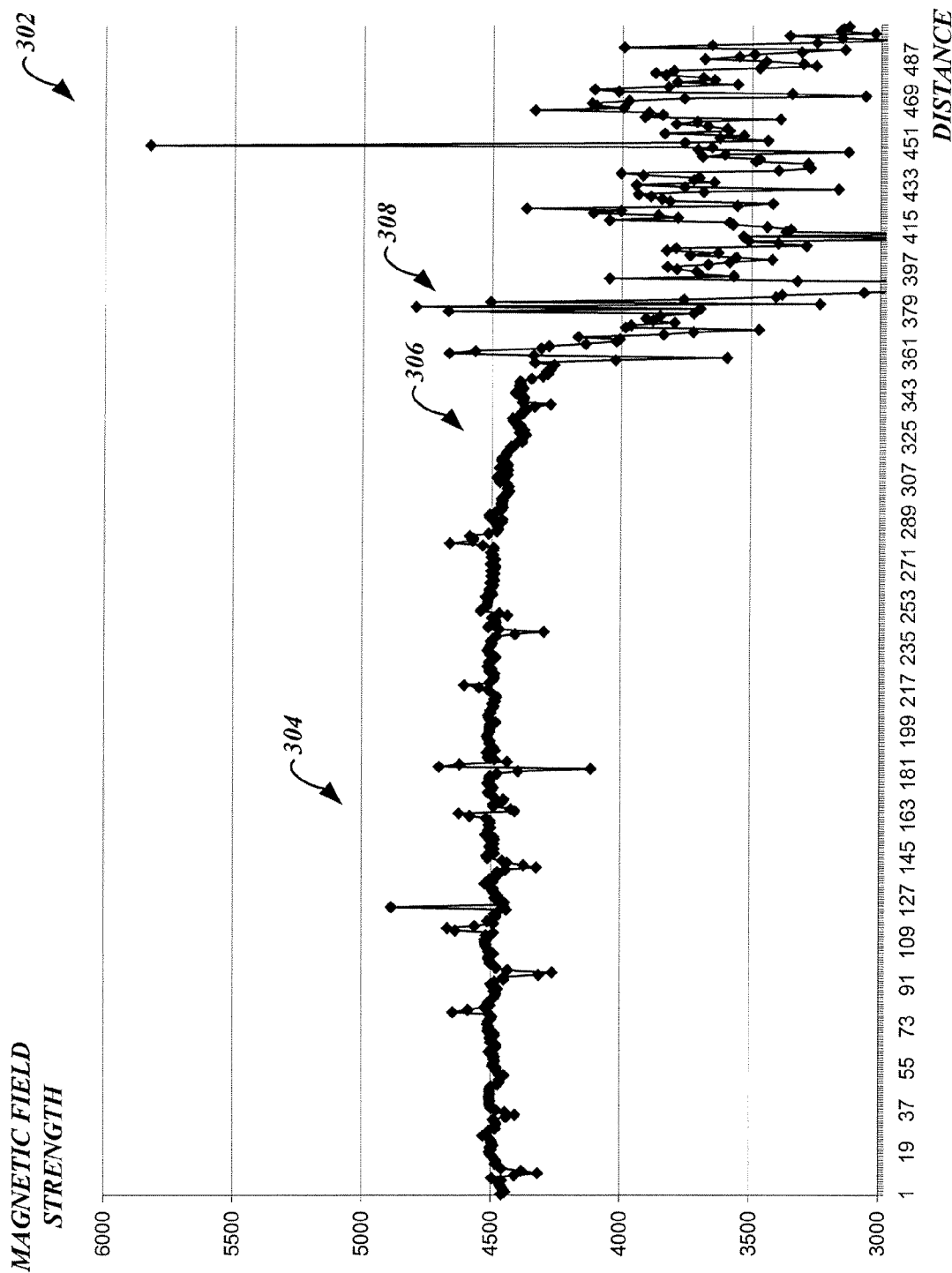
FIG. 3 is a plot of a sample of the magnetic field magnitude while walking from an outdoor environment into a structure.

FIG. 3 is a plot 302 of a sample of the magnetic field magnitude while walking from an outdoor environment into a structure. The plot 302 initially appears to be similar to the plot 202 (FIG. 2) during the first portion 304 of the data, with the baseline magnetic field strength at substantially 4500 counts. As the navigation system 100 traverses along a side of the structure, the magnetic field strength begins to fall (see distance at approximately step 289, and continuing through approximately step 360), as illustrated by the second portion 306 of the data. And, when the navigation system 100 enters the structure and continues to travel through the structure, the magnetic field strength decreases dramatically (see distance at approximately step 361) and begins to exhibit a "scratchiness" as shown by the relatively large changes in peak-to-peak magnitude of the magnetic field strength, as illustrated by the third portion 308 of the data.

The measured magnetic field strength is used to determine that the navigation system 100 has entered a structure. Therefore, the navigation system 100 may assess the likelihood that the location information provided by the GNSS unit 102 has become inaccurate. The process of determining entry of the navigation system 100 into a structure can be logically organized into three steps: initialization, detection, and notification.

Initialization involves determining a baseline value for the magnetic field strength when the navigation system 100 is located in an external environment (i.e., outdoors). That is, a baseline magnetic field characteristic corresponding to magnetic field strength is determined when the navigation system 100 is outdoors where a sufficient number of GNSS satellite signals are available for accurate location determination by the GNSS unit 102.

For instance, baseline magnetic field strength is determined be one embodiment by averaging observed magnetic field strengths sensed by the magnetic field detection unit 118 while navigating outside for some specified distance and/or period of time. The data collection process is controlled by the processor system 106 which selectively stores information provided by the magnetic field detection unit 118. That is, the processor system 106 causes the magnetic field detection unit 118 to sense an outdoor magnetic field strength a plurality of different times while the navigation system 100 is outdoors.

During the initialization phase, one or more thresholds are set. These thresholds are constants that are used during the magnetic field strength detection phase. One exemplary threshold is a standard deviation threshold corresponding to a standard deviation of the magnetic field strength. Another exemplary threshold is a differential magnetic field strength threshold corresponding to an amount of change between the baseline magnetic field strength (interchangeably referred to an outdoors magnetic field strength) and the currently monitored magnetic field strength. The thresholds can be set manually or automatically.

In one embodiment, a user manually indicates that the navigation system 100 is travelling outside, via interface 110. For example, a button or other suitable device may be actuated by the user of the navigation system 100 to indicate if they are outside such that the baseline and thresholds should be initialized. Alternatively, or additionally, the navigation system 100 may determine that it is outdoors when the GNSS unit 102 is known to be accurately receiving signals from a predefined number of GNSS satellites. For example, the GNSS unit 102 may be receiving signals from ten or more GNSS satellites. Thus, the number of received GNSS satellite signals may indicate to the navigation system 100 that it is outdoors.

Detection involves determining that the navigation system 100 has entered into a structure (where the GNSS unit 102 will not be likely to determine accurate location information). The detection phase involves filtering the data corresponding to sensed magnetic field strength over a period of time or distance, keeping track of the average (mean value) magnetic field strength, determining the variation (standard deviation, or peak-to-peak values) in the magnetic field strength as a function of the path of travel, and comparing the determined variations with the thresholds. When the determined variations have crossed over the thresholds for some minimum time period, the navigation system 100 may conclude that the location information from the GNSS unit 102 may be suspect.

A differential filter 124, implemented as software in the position determination logic 120 by some embodiments, can be used during the detection phase. For example, an embodiment of the navigation system 100 may use the differential filter 124 to monitor a difference between the average of two successive blocks of magnetic field strength data to detect a change in the relative level of the magnetic field strength.

Additionally, detection of the entry of the navigation system 100 into a structure can further include consideration of information from the GNSS unit 102 itself. For example, if the navigation system 100 observers a decrease in the number of viewable GNSS satellites. If the GNSS unit 102 indicates a loss of a significant number of GNSS satellite signals simultaneously with a significant decrease in the detected magnetic field strength, the expectation that the navigation system 100 is entering a structure is reinforced. In one embodiment, a decrease in the number of detected GNSS satellites decreasing below a threshold is correlated with changes in the magnetic field strength to indicate the entry of the navigation system 100 into a structure. Alternatively, or additionally, a change in the number of detected GNSS satellites may be correlated with changes in the magnetic field strength to indicate the entry of the navigation system 100 into the structure.

Figure 4:
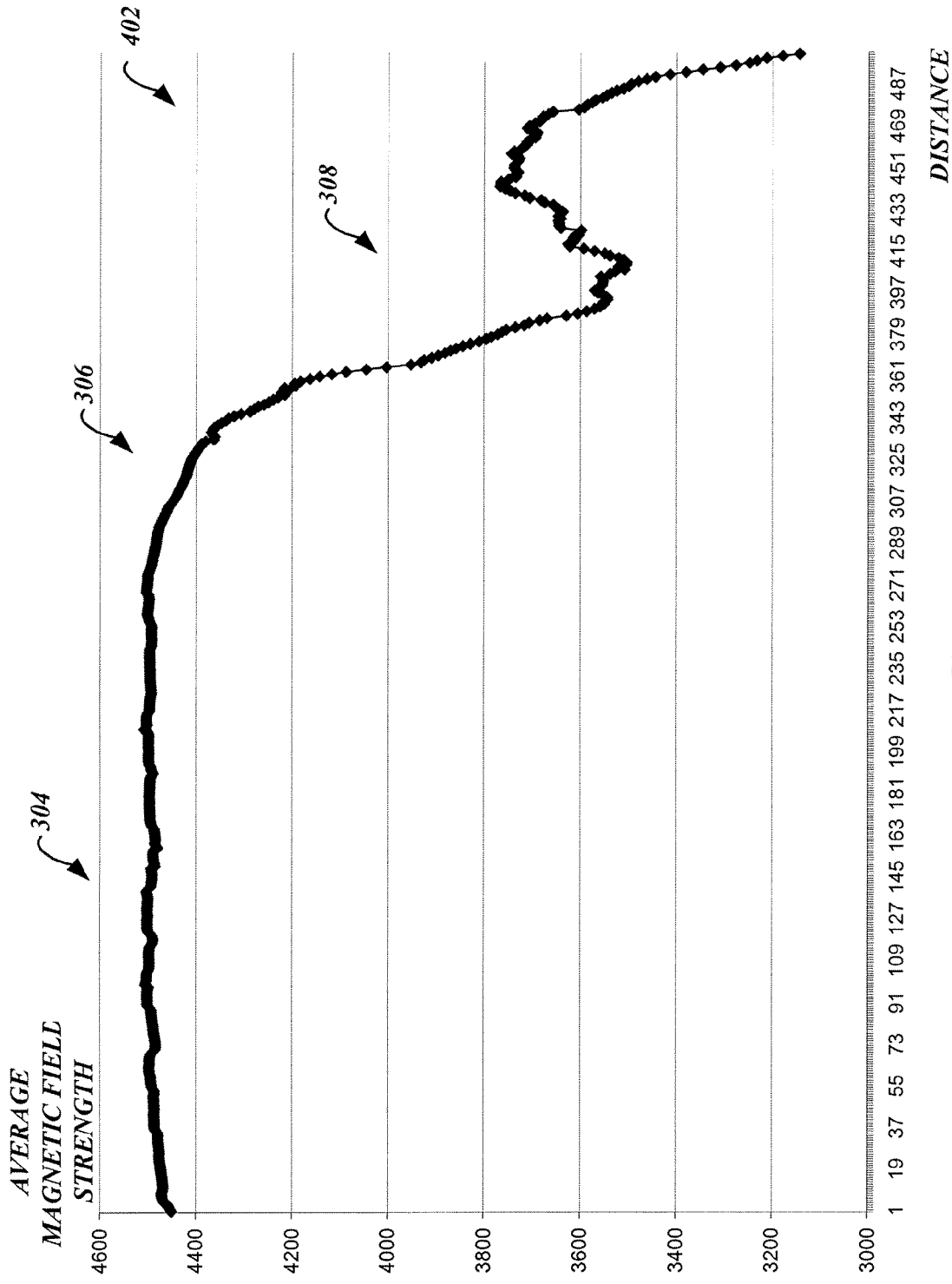
FIG. 4 is a plot of the average magnetic field strength of the magnetic field strength plot of FIG. 3.

FIG. 4 is a plot 402 of the average magnetic field strength of the magnetic field strength plot 302 (FIG. 3) based on a rolling average of the preceding fifty strides. Rolling averages may be based on time, measured distance travelled, or any other suitable indicia. Various embodiments may use any suitable means to determine an average, mean, and/or mode of magnetic field strength along a path of travel. In an exemplary embodiment, a ten percent (10%) drop in the magnetic field strength is sufficient for detection of entry of the navigation system 100 into the structure. That is, differential magnetic field strength threshold corresponding to a magnetic field strength decrease to ninety percent (90%) of the baseline magnetic field strength may be used to detect entry of the navigation system 100 into a structure.

Additionally, the "scratchiness" of the magnetic field strength may become very discernable when the navigation system 100 is in a structure. That is, the magnetic field strength exhibits very discernable (relatively large) changes in peak-to-peak magnitude of the magnetic field strength. A standard deviation corresponding to the change in the magnetic field strength may be used to identify the degree of "scratchiness" of the detected magnetic field strength.

A standard deviation of two percent (2%) or less is common for outdoor samples of magnetic field strength data points. Going indoors into the structure may cause as much as a thirteen percent (13%) drop in the magnetic field strength. This 13% drop in the magnetic field strength corresponds to an increase in the standard deviation to over twenty five percent (25%). That is, a standard deviation threshold of 25%, corresponding to a change in the current magnetic field strength from the baseline magnetic field strength may be used to detect entry of the navigation system 100 into a structure.

Figure 5:
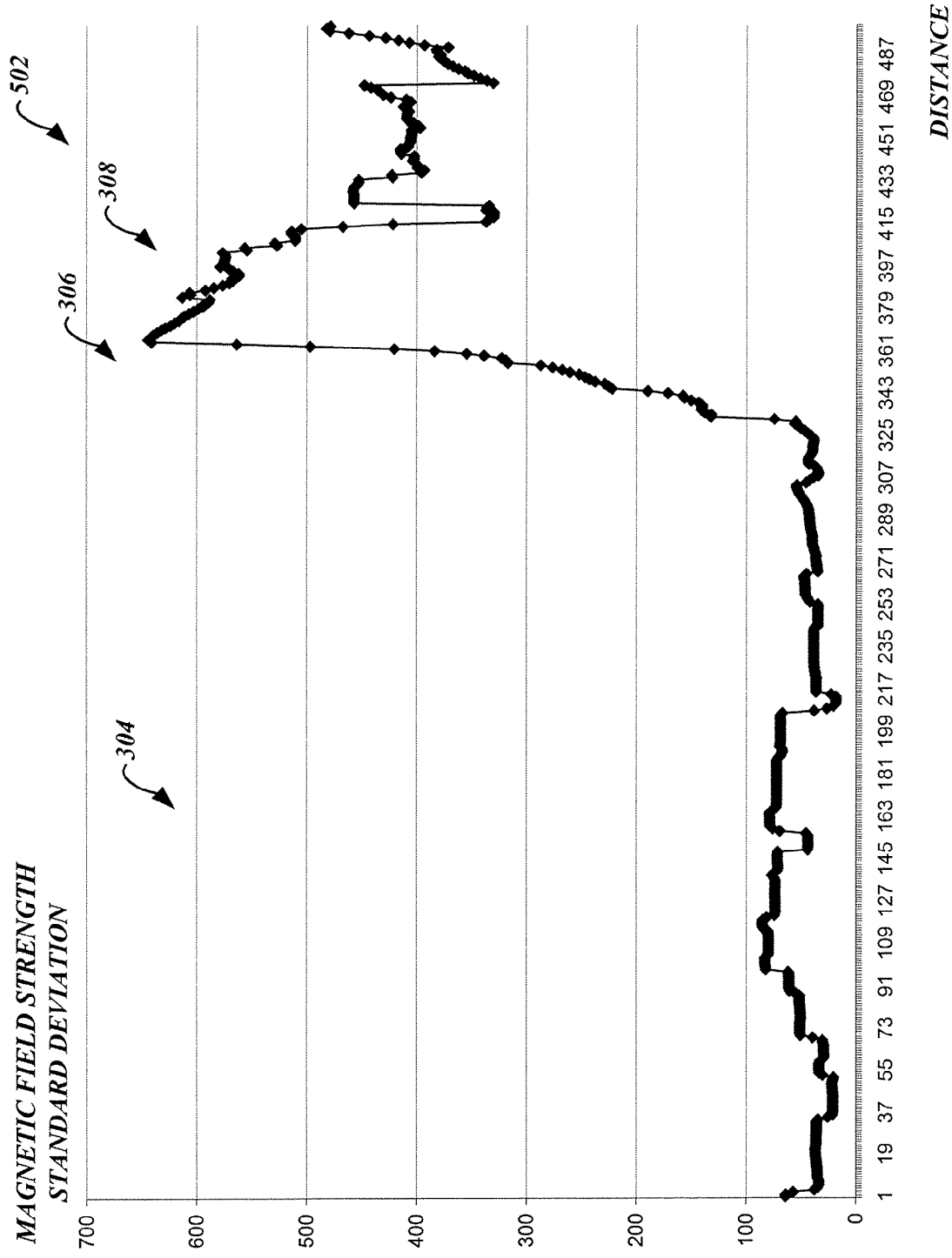
FIG. 5 is a plot of the standard deviation of the magnetic field strength plot of FIG. 3.

FIG. 5 shows a plot 502 of the standard deviation for a window of samples of the average magnetic field strength plot 402 (FIG. 4). An increase in the standard deviation by a factor of three to four times is used by an embodiment of the navigation system 100 to determine entry of the navigation system 100 into a structure. Alternative embodiments of the navigation system 100 may use any suitable measure of the increase in the standard deviation to determine entry of the navigation system 100 into the structure.

Figure 6:
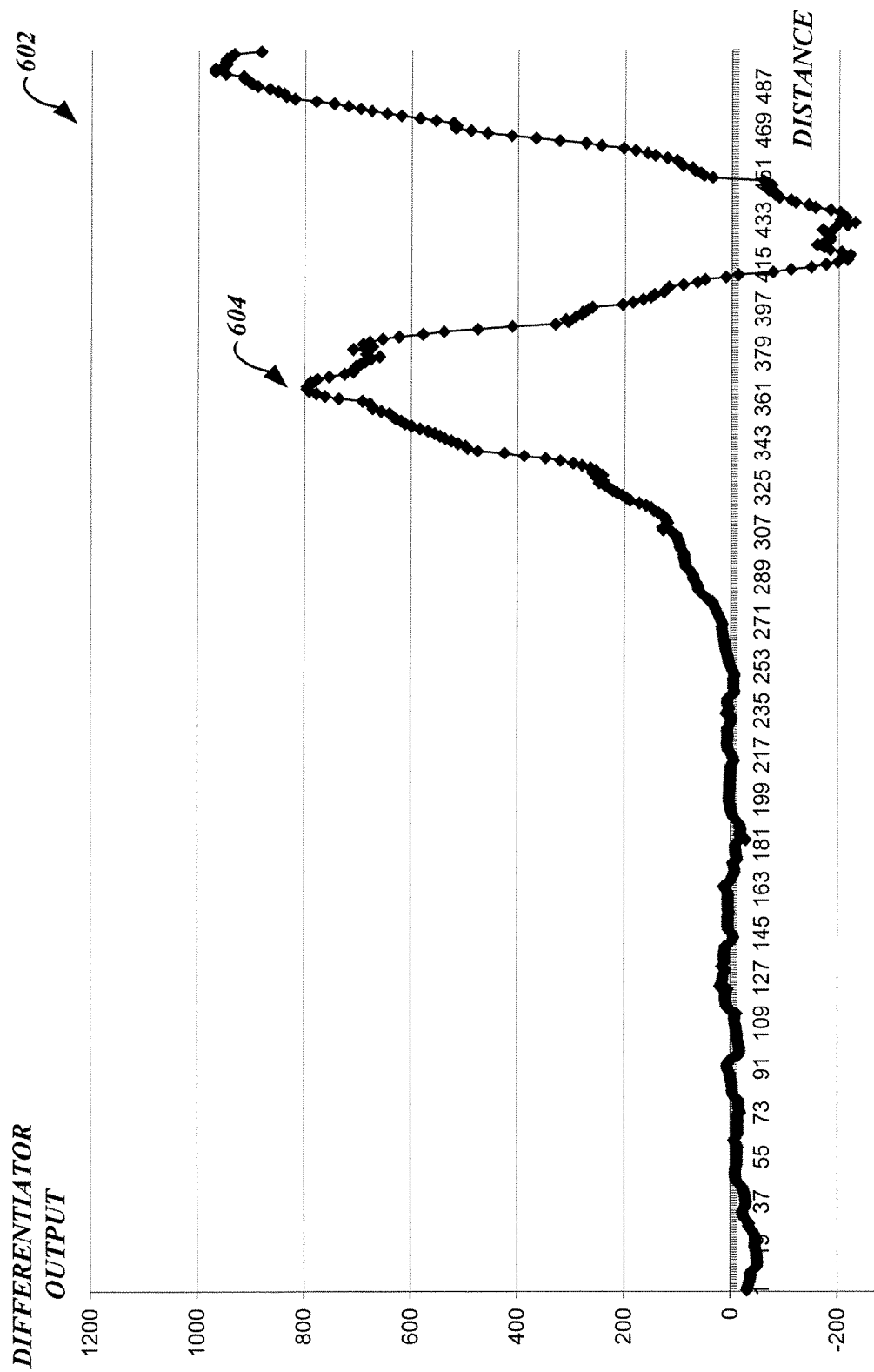
FIG. 6 is a plot of an output of a differential filter which has processed the data of the plot of FIG. 3.

FIG. 6 is a plot 602 of an output of the differential filter 124 which has processed the data of the plot 302 (FIG. 3). Preferably, the differential filter 124 is implemented as a function in the position determination logic 120 (FIG. 1). Alternatively, a differential filter 124 may be implemented as hardware, firmware, or a combination thereof.

The peak 604 of the differentiator output plot 602 occurs at substantially the same point that the standard deviation of the plot 502 (FIG. 5) makes a sharp increase. The location of the peak 604 may be used to determine the point at which the navigation system 100 entered the structure.

The notification phase includes indication of an entry of the navigation system 100 into a structure and/or exit of the navigation system 100 from the structure. As noted above, the magnetic field strength and the standard deviation change in a statistically detectable manner when the navigation system 100 enters a structure. In such situations, some embodiments of the navigation system 100 decrease participation of the GNSS unit 102 and increase participation of the navigation sensor system 104 in the navigation solution during the estimation of the current position of the navigation system 100. In some embodiments, the location information received from the GNSS unit 102 is disregarded upon determination that the navigation system 100 has entered a structure such that the current position is estimated from the information provided by the navigation sensor system 104.

Conversely, the magnetic field strength changes in a statistically detectable manner when the navigation system 100 leaves the structure. For example, the magnetic field strength increases and the standard deviation decreases in a statistically detectable manner when the navigation system 100 leaves the structure. In such situations, some embodiments of the navigation system 100 increase participation of the GNSS unit 102 and decrease participation of the navigation sensor system 104 in the navigation solution during the estimation of the current position of the navigation system 100. In some embodiments, location information received from the navigation sensor system 104 is disregarded upon determination that the navigation system 100 has left the structure such that the current position is estimated from the location information provided by GNSS unit 102.

Other embodiments may use a weighting system wherein the location information received from the GNSS unit 102 is blended with information provided by the navigation sensor system 104. For example, when the navigation system 100 determines that a structure has been entered, the information provided by the navigation sensor system 104 is more heavily weighted over the location information received from the GNSS unit 102. Conversely, upon determination that the navigation system 100 has left the structure, the location information received from the GNSS unit 102 is more heavily weighted over the information provided by the navigation sensor system 104. The blending may be performed by the software of the position determination logic 120. Alternatively, a filter may be used to blend the information. An exemplary embodiment uses a Kalman type filter to blend the location information received from the GNSS unit 102 with the information provided by the navigation sensor system 104.

The above-described embodiment of the navigation system 100 that blends the location information received from the GNSS unit 102 with the information provided by the navigation sensor system 104 recognizes that there may be delays in any filter. That is, there may be some discernable time delay for the navigation system 100 to determine that it has entered a structure. That is, the navigation system 100 determines that it is in a structure only after being inside the structure for some period of time. Accordingly, a better estimate of position can be obtained in an embodiment that extrapolates back by some predefined amount of time and/or distance, and disqualifies the corresponding location information provided by the GNSS unit 102 back from the time the navigation system 100 estimates entry into the structure. In such embodiments, a history of location information is maintained in memory 108.

Figure 7:
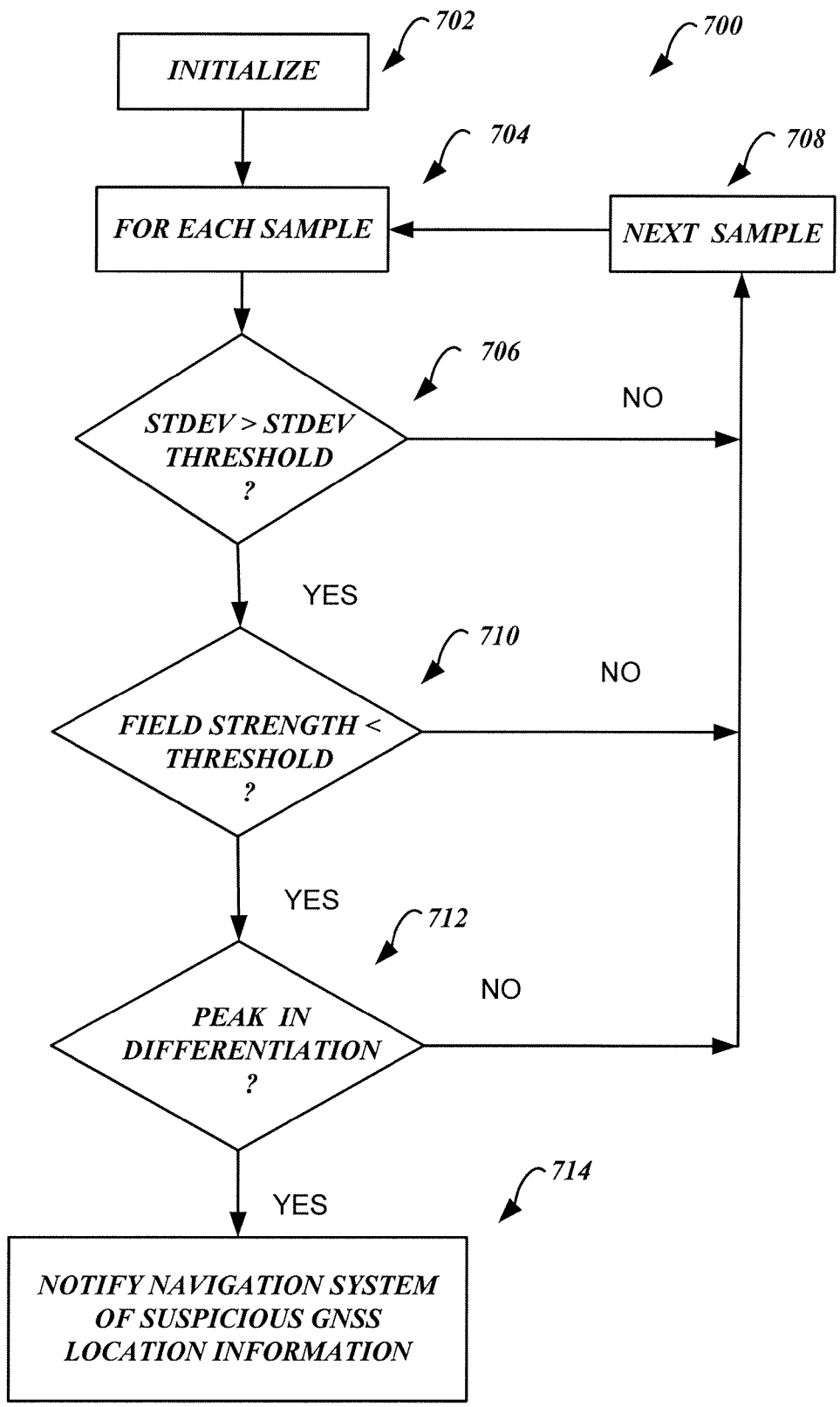
FIG. 7 is a flowchart 700 illustrating a process of determining entry into a structure from analysis of the detected magnetic field strength used by an embodiment of the navigation system.

FIG. 7 is a flowchart 700 illustrating a process of determining entry into a structure from analysis of the detected magnetic field strength used by an embodiment of the navigation system 100. It should be noted that in some alternative implementations, the functions noted in the blocks may occur out of the order noted in FIG. 7, may include additional functions, and/or may omit some functions. For example, two blocks shown in succession in FIG. 7 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

The process initializes the baseline magnetic field strength, the thresholds, and/or the sample sizes at block 702. A sufficient sampling size may range from ten (10) to one hundred (100) steps, or approximately that distance in meters, feet, or other suitable unit of distance. Thus, a sampling size includes sufficient data to perform a statistically meaningful analysis of the detected magnetic field strength data.

At block 704, the magnetic field strength data is collected from the magnetic field detection unit 118 (FIG. 1). In an embodiment of the navigation system 100 implemented in a pedometer, a data sampling rate of once per step is sufficient. Other embodiments may sample the detected magnetic field strength at any suitable sampling rate so that the navigation system 100 may perform a statistically meaningful analysis of the detected magnetic field strength data.

At block 706, the standard deviation of the magnetic field strength data is compared, over the most recent N samples, to the corresponding standard deviation threshold. If the standard deviation does not exceed the threshold (the NO condition), the process proceeds to the next sample at block 708. The process then loops back to block 704.

However, if at block 706 the standard deviation exceeds the thresholds (the YES condition), the process proceeds to block 710. At block 710, the process checks if the magnetic field strength has dropped below a corresponding magnetic field strength threshold. If not (the NO condition), the process proceeds to the next sample at block 708. The process then loops back to block 704.

However, if at block 710 the magnetic field strength remains below the threshold, the process proceeds to block 712. At block 712, a determination is made whether a location of the transition has been identified using a differentiator, a differentiation filter, or the like. If not, (the NO condition), the process proceeds to the next sample at block 708. The process then loops back to block 704.

However, if a peak has been identified by the differentiator (the YES condition), the navigation system 100 proceeds to block 712 and determines that it has entered into a structure and that the location information received from the GNSS unit 102 is likely suspicious and may be in error.

In an alternative embodiment, the navigation system 100 does not include the navigation sensor system 104. Such a navigation system 100 determines position on GNSS information provided by the GNSS unit 102. The navigation system 100 includes the magnetic field detection unit 118 such that the navigation system 100 can determine entry into a structure wherein the position information provided by the GNSS unit 102 may be then known to become invalid.

In an alternative embodiment, the navigation sensor system 104 does not include the magnetic field detection unit 118. The magnetic field detection unit 118 is included as a stand alone component.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
   sensing a characteristic of an outdoor magnetic field at a plurality of different times;
   averaging the plurality of sensed outdoor magnetic field characteristics to determine a baseline magnetic field characteristic;
   sensing a current characteristic of a current magnetic field at a current position;
   comparing the current characteristic of the current magnetic field at the current position with the baseline magnetic field characteristic of the outdoor magnetic field;
   automatically without user input determining entry into a structure when the current characteristic of the current magnetic field varies from the baseline magnetic field characteristic of the outdoor magnetic field by more than a first threshold; and
   when entry into the structure is determined in response to the current characteristic of the current magnetic field varying from the baseline magnetic field characteristic of the outdoor magnetic field by more than a first threshold, automatically without user input reducing reliance on location information received from a global navigation satellite system relative to other types of location information while calculating the current position.

2. The method of claim 1, wherein the current characteristic of the current magnetic field of the current position is a current magnetic field strength, wherein the baseline magnetic field characteristic of the outdoor magnetic field is an outdoor magnetic field strength, and wherein the threshold is a differential magnetic field strength threshold.

3. The method of claim 1, wherein the current characteristic of the current magnetic field of the current position is a current magnetic field strength, wherein the baseline magnetic field characteristic of the outdoor magnetic field is an outdoor magnetic field strength, and further comprising:
   determining a standard deviation in a change of the current magnetic field strength of the current position referenced to the outdoor magnetic field strength; and
   determining entry into the structure in response to the determined standard deviation exceeding a standard deviation threshold.

4. The method of claim 1,
   wherein magnetic field strength is the characteristic of both the outdoor magnetic field and the current magnetic field and wherein the baseline magnetic field characteristic is a baseline magnetic field strength.

5. The method of claim 4, wherein determining that the navigation system has entered the structure comprises:
   sensing a current magnetic field strength of the current position; and
   determining entry into the structure in response to the sensed current magnetic field strength decreasing by a predefined amount below the baseline magnetic field strength.

6. The method of claim 1, further comprising:
   receiving an indication that a number of global navigation satellite system (GNSS) satellite signals received by a GNSS unit has decreased;
   reinforcing the determination that the navigation system has entered the structure in response to receiving the indication that the number of GNSS satellite signals received by the GNSS unit has decreased at substantially a same time that the entry into the structure is determined when the current characteristic of the current magnetic field varies from the baseline magnetic field characteristic of the outdoor magnetic field by more than the first threshold;
   determining that location information from the GNSS unit is invalid in response to determining that the navigation system has entered the structure; and
   estimating a current position based upon at least one of a sensed direction, a sensed rotation, and a sensed acceleration.

7. The method of claim 1, further comprising:
   estimating a present position in the structure based upon information received from at least one of a compass, an accelerometer, and a gyroscope.

8. The method of claim 1, further comprising:
   sensing an outdoor magnetic field strength when the navigation system is outdoors in proximity to the structure; and
   determining the characteristic of the outdoor magnetic field based upon the sensed outdoor magnetic field strength.

9. The method of claim 1, further comprising:
   determining exit from the structure when the current characteristic of the current magnetic field varies from the baseline magnetic field characteristic of the outdoor magnetic field by less than a second threshold; and
   when exit from the structure is determined, increasing reliance on the location information received from the global navigation satellite system in calculating the current position.

10. The method of claim 9, wherein the first threshold is larger than the second threshold.

11. A navigation system, comprising:
    a navigation sensor system operable to generate information corresponding to at least one of a direction, a rotation, and an acceleration;
    a magnetic field detection unit operable to sense a magnetic field; and
    a global navigation satellite system (GNSS) unit operable to receive a plurality of GNSS satellite signals and operable to help determine a current position of the navigation system; and a processor system communicatively coupled to the navigation sensor system, the magnetic field detection unit, and the GNSS unit, and the processor system operable to:
  cause the magnetic field detection unit to sense a characteristic of an outdoor magnetic field at a plurality of different times;
  average the plurality of sensed outdoor magnetic field characteristics to determine a baseline magnetic field characteristic;
  cause the magnetic field detection unit to sense a current characteristic of the current magnetic field at the current position of the navigation system from information received from the magnetic field detection unit;
  compare the current characteristic of the monitored magnetic field with the baseline magnetic field characteristic of the outdoor magnetic field;
  automatically without user input determine that the navigation system has entered a structure when the current characteristic of the monitored magnetic field varies from the baseline magnetic field characteristic of the outdoor magnetic field by more than a first threshold; and
  when entry into the structure is determined in response to the current characteristic of the current magnetic field varying from the baseline magnetic field characteristic of the outdoor magnetic field by more than a first threshold, automatically without user input reduce reliance on location information received from a global navigation satellite system relative to other types of location information while calculating the current position of the navigation system.

12. The navigation system of claim 11, further comprising:
a memory communicatively coupled to the processor system, and operable to store information corresponding to the characteristic of the outdoor magnetic field.

13. The navigation system of claim 11, wherein the characteristic of the current magnetic field is a monitored magnetic field strength, wherein the characteristic of the outdoor magnetic field is an outdoor magnetic field strength, and wherein the threshold is a differential magnetic field strength threshold.

14. The navigation system of claim 11, wherein the baseline magnetic field strength is the characteristic of both the outdoor magnetic field and the current magnetic field and wherein the baseline magnetic field characteristic is a baseline magnetic field strength.

15. The navigation system of claim 11, wherein the processor system is further operable to:
  determine that the navigation system has exited the structure when the current characteristic of the outdoor magnetic field varies from the baseline magnetic field characteristic of the outdoor magnetic field by less than a second threshold; and
  when exit from the structure is determined, increasing reliance on the location information received from the global navigation satellite system in calculating the current position.

16. The navigation system of claim 15, wherein the first threshold is larger than the second threshold.

17. A system for determining that a navigation system has entered a structure, comprising:
  means for sensing a characteristic of an outdoor magnetic field at a plurality of different times;
  means for averaging the plurality of sensed outdoor magnetic field characteristics to determine a baseline magnetic field characteristic;
  means for sensing a current characteristic of a current magnetic field at a current position of the navigation system;
  means for comparing the current characteristic of the current magnetic field at the current position with the baseline magnetic field characteristic of the outdoor magnetic field;
  means for automatically without user input determining that the navigation system has entered the structure when the current characteristic of the monitored magnetic field varies from the baseline magnetic field characteristic of the outdoor magnetic field by more than a first threshold; and
  means for automatically without user input reducing reliance on location information received from a global navigation satellite system relative to other types of location information while calculating the current position when entry into the structure is determined in response to the current characteristic of the current magnetic field varying from the baseline magnetic field characteristic of the outdoor magnetic field by more than a first threshold.

18. The system of claim 17, wherein the means for determining that the navigation system has entered the structure determines a difference between the current characteristic of the current magnetic field and the baseline magnetic field characteristic of the outdoor magnetic field, for comparing the determined difference with the first threshold, and determining that the navigation system has entered the structure in response to the difference exceeding the first threshold.

19. The system claim 17, wherein the current characteristic of the current magnetic field of the current position is a current magnetic field strength, wherein the baseline magnetic field characteristic of the outdoor magnetic field is an outdoor magnetic field strength, and wherein the threshold is a differential magnetic field strength threshold.

20. The system of claim 17, further comprising:
  a means for sensing a direction, a rotation, and an acceleration; and
  a means for determining a current position of the navigation system from at least one of a sensed direction, a sensed rotation, and a sensed acceleration in response to determining that the navigation system has entered the structure.

* * * * *